United States Patent Office 3,420,676
Patented Jan. 7, 1969

3,420,676
FERMENTING VEGETABLE MASH TO PRODUCE A STABLE VEGETABLE JUICE WITH SIMULTANEOUS PRODUCTION OF FERMENTED FODDER
Fritz Günther Keitel, Seestrasse 300, 8267 Berlingen, Thurgair, Switzerland
No Drawing. Filed Mar. 14, 1966, Ser. No. 533,828
Claims priority, application Switzerland, Apr. 1, 1965, 4,521/65
U.S. Cl. 99—105    7 Claims
Int. Cl. A23l *1/02;* A23k *3/02*

ABSTRACT OF THE DISCLOSURE

An improved method of producing vegetable juices by subjecting the vegetable mash to a lactic acid fermentation until the pH has dropped to below 4.5, and then squeezing the juice out of the mash. The juice is then pasteurized. The fermented mash may be admixed with an unfermented mash prior to squeezing out the vegetable juice, and the squeezed out juice exhibiting a stable Tyndall effect.

---

The present invention relates to an improved method of producing vegetable juices with simultaneous production of pickled fodder and inoculation material for the preparation of fermented fodder, and also is concerned with products obtained by the aforesaid method.

For the production of durably preserved vegetable juices, applicant in his United States Patent 2,982,657 has proposed a method according to which vegetable juice is subjected to lactic acid fermentation which is interrupted, after a pH-value of 3.4–4.5 is attained, and the juice is then pasteurized.

As follows from the teaching of the aforementioned patent reciting the measure of interrupting the fermentation, the maintenance of not too low a pH-value is of great importance. On the one hand, the pH-value must be low enough in order to attain a sufficient preservation effect; on the other hand, however, it must not be so low that the juices acquire too sour a taste.

It has now been surprisingly found that, by performing the lactic acid fermentation on the mash prepared from the vegetable, instead of on the juices themselves, the taste of the juices recovered from the fermented mash is less pronounced sour and, accordingly, the lower limit of its pH-value is no longer of the same importance as that attributed to such value for reasons of taste according to the method of the aforesaid patent.

The present invention accordingly relates to a method for the preparation of durably preserved vegetable juices while simultaneously producing pickled fodder and ferments for the preparation of fermented fodder which is characterized in that the mash prepared from the vegetable is subjected to lactic acid fermentation, whereafter juice is recovered from the fermented mash and is pasteurized.

As compared with juice obtained by the method according to the United States patent specification 2,982,657, by the new and improved method according to the present invention a juice is obtained, which at the same or even a lower pH-value has a less pronounced sour taste. This makes it possible to do with less accurate control of the fermentation, so that interruption of the fermentation independent of the pasteurization may be dispensed with.

Apart from the fact that the method according to the invention leads to a mildly sour taste even with a comparatively low pH-value thereof, it is surprising to find that the juice obtained by the new method differs in biological and bio-chemical respects from a juice produced according to the aforesaid patent specification.

By producing juices by the method according to the present invention, which in spite of a mild lactic-acidic taste have a higher content in lactic acid than the juices known hitherto, their therapeutic-physiological effect is also increased.

An additional advantage of the method according to the present invention is, that as a by-product a lactic-acidic residue is obtained which is permeated by a multitude of live lactic acid bacteria, and may be rammed or otherwise introduced as a pickled fodder into silos. Alternatively, this residue may also be mixed as a fermentation agent with fresh fodder, if desired with the addition of certain known carbohydrates, and rammed into silos, where the lactic acid fermentation is then continued and leads to the preserving of the entire mixture as a pickled fodder. The pickled fodder thus obtained has a pleasant aromatic acidulous smell and fresh olive-green appearance.

Thus, a further aspect of the present invention is also concerned with the use of the lactic-acidic residue obtained as a by-product of the aforesaid method for the production of silo-fodder, characterized in that the acid residues by themselves or together with fresh fodder are rammed into a silo and that, in the case of such a mixture, the same is allowed to ferment in the silo to form pickled fodder.

By the method according to the present invention in combination with the above use of the by-product thus, on the one hand, there is produced a mildly acidic, new and improved vegetable juice of high grade taste and best keeping quality and, on the other hand, an acidic residue is obtained which yields by itself or when further processed as indicated hereinabove, an excellent pickled fodder in a natural way. Thus a product is obtained which is superior to the vegetable juices hitherto known while at the same time the residues can be fully utilized as a fodder for animals.

Accordingly, it is a primary object of this invention to provide an improved method for the production of vegetable juices with simultaneous production of pickled fodder and inoculation material for the preparation of fermented fodder, and also is concerned with improved products obtained by the aforesaid method.

Another, more specific object of this invention relates to an improved method for the production of vegetable juices having a mildly lactic-acidic taste yet a higher content of lactic acid than juices produced according to prior art techniques, and wherein a by-product, formed during juice production, can itself be used as a pickled fodder or further employed to form a pickled fodder.

An additional noteworthy object of this invention is directed to an improved method for the porduction of vegetable juices which can be carried out economically and relatively easily, resulting in a vegetable juice of high grade taste, best preservation quality, high lactic acid content, and exhibiting a Tyndall effect.

In general, to implement these and still further objects of the invention which will become more readily apparent as the description proceeds, one will commence in such a manner that lactic acid bacteria are added to the vegetable before or during its being minced or alternatively to the mash, and that the mash is then allowed to ferment to a maximum pH-value of 4.5. As a rule, from a scientific point of view fermentation of the mash should be conducted to a pH-value of 4.2 in order to obtain a sufficient preservation of the juices, the lower pH-values being obviously thoroughly acceptable. In practice, in certain cases, however, even a pH-value of 4.5 may be acceptable. When the above upper limit is observed, for the lower limit of the pH-value only the acceptability of the acidic taste will be decisive. Since, however, for reasons not yet fully understood the juices obtained by the method according to the present invention have a very mild acidic taste, this lower limit has no critical importance.

In a particular embodiment of the invention the mash is allowed to ferment until the drop is pH-value continues only very slowly, which usually begins at a value of about 3.8–3.7. Then the juice may be decanted into bottles and pasteurized. During the period of decanting no major fluctuations of the pH-value can occur in the charge. The acceptability of such low pH-values is given owing to the mildly acidic taste of the products of the method according to the present invention. It is of advantage to effect the fermentation as rapidly as possible lest undesirable side-reactions take place. Of course, pasteurization could also be performed before or during decanting.

Should the juices be too sour for some purpose in spite of the above advantages attained by the present invention, the following procedure may be followed: the sour mash is mixed with unfermented, i.e. sweet mash, of like or different origin, an appropriate pH-value compensation being attained by selecting a suitable mixing ratio. Then the mixed mash is squeezed and the juice further processed as usual. As compared with the mixing of acid and sweet juice for the purpose of correcting the pH-value, the double advantage is attained that the mixed residues obtained are acidic and accordingly preserved, and that only one press is required. The mixed residues contain more than one hundred million live germs per gram, which is quite sufficient for rapid fermentation and preservation thereof. Moreover, there is the advantage, particularly with carrot juice, that the stabilizing so-called Tyndall effect is attained which otherwise is inherent only to the raw juice and that the addition of protective colloids for stabilization, i.e. homogenization may be dispensed with.

The method according to the invention is preferably carried out in practice in such a manner that the vegetables are washed clean and subsequently blanched in hot water. The blanched vegetables must yield an unequivocal raw vegetable reaction. Then the vegetables are minced. The inoculation of lactic acid bacteria may be effected either before or preferably during the mincing operation since then a thorough mixing is attained. Obviously the bacteria may also be admixed subsequently to the previously minced mash. By the blanching the temperature of the mash has already been raised and will lie, as a rule, betwen 30° C. and 40° C. which is sufficient for fermentation to proceed rapidly. After about 13 to 14 hours the fermentation of the mash is as a rule terminated, when unmixed mash is squeezed, whereafter the juice is squeezed out and is pasteurized in vessels. The juice may, for example, be heated by means of a plate heat exchanger to pasteurization temperature immediately before decanting, so that the heating-up period is reduced as compared with heating-up in bottles.

When sweet and sour mashes are mixed before recovering the juice, the mixing ratio depends on the pH-value desired of the end product. Naturally, the fermentation period of the sour mash is then somewhat prolonged. By this manner of procedure, economical advantages are attained owing to considerable savings in space when preparing the material required for fermentation. While according to the teachings of the aforementioned United States Patent, 6,000 liters of fermentation volume are required for producing 6,000 liters of juice, an optimum volume of only 3,000 liters is required according to the present invention.

In order to more fully explain the invention the following examples are hereinafter given.

EXAMPLE I

For producing 5,600 liters of juice, 3,000 liters of acidic mash and 4,000 liters of sweet mash are required, no fermentation vessel being necessary for the latter so that almost half (i.e. 46%) of the fermentation volume is saved.

When the fermented and unfermented juices are mixed, precipitation of carrotene takes place. However, when mixing fermented and unfermented mash as according to the present invention, a stabilization (Tyndall effect) takes place, such as with carrots, so that the juice can be kept homogeneous for a long time.

When preparing the mash, i.e. when mincing or comminuting the vegetables, it is of particular advantage if the vegetable is shredded to fibers or a fibrous pulp, such as is done in some juice centrifuges. A mash is then obtained which when further treated by the method according to the present invention leads, in general, to a large yield, a better opening-up of carrotene, and a higher percentage of juice.

When using a continuously working press for practising the method according to the present invention, the process of juice recovery may be made continuous. This is particularly so when mixing acidic and sweet mashes. Continuously working presses have also the advantages of subjecting the pressed material to kneading, such as is the case in screw presses, whereby not only the yield of the juice but also the intensity of the coloration is increased.

The quantity of bacteria added, the temperature and period of fermentation as well as all other factors must be adjusted for each case in accordance with the raw material, which offers no difficulty to a person skilled in the art. This is necessary since the vegetables as a natural product are inherently liable to variations.

In the following example it should be noted that the conditions mentioned there may undergo variations, depending upon the raw material: As far as the pH-value of the finished juices is concerned, the same will, as a standard value, lie between 4.2 and 3.9, values of 4.1 being particularly preferable for carrot juice, 4.0 for celery juice, and 3.9 for cabbage juice. All sorts of vegetables, particularly root vegetables are suitable for treatment by the method according to the present invention: for example, potatoes, turnips, carrots, cabbage, tomatoes, cucumbers, etc.

EXAMPLE II

The raw material, in the present case carrots, is thoroughly washed and blanched with water of preferably 95° C., the size conditions of the carrots being taken into consideration. The blanching is performed such that the minced material still reacts positively, i.e. as raw, to the catalase test. This comminuted material is then ground to a mash capable of being pumped and pressed. The inoculation of lactic acid bacteria is effected upstream or downstream of the mill at a rate of about 2.5 liters (about 0.25%) per 1,000 kilograms of raw material, a fresh culture of lactic acid bacteria to be used.

The raw material has been preheated by the blanching so that the mash has a temperature of about 35° C., which is advantageous for a rapid course of the fermentation. When a different, i.e. a higher or lower temperature is desired, this may be controlled by appropriate choice of temperature of the blanching water and of the blanching period, heating of the mash also coming into consideration.

The mash, to which e.g. 0.2% protective colloids (such as alginate solution) may be added, is fermented in a vessel of stainless steel, with or without a stirring mechanism, until a suitable acidity e.g. a pH-value of 3.7 to 3.8 is attained, which in the present case takes an average of about 14 hours. Then the mash is pumped off into the press, the juice is squeezed out and filled either into a storage reservoir or directly into containers for sale e.g. bottles; a plate-heat exchanger preferably being interposed for the purpose of heating-up to pasteurization temperature. It is also conceivable to additionally or alternatively add suitable protective colloids to the juice.

If it is desired, according to a particular embodiment of the method, to admix raw mash, one proceeds likewise with the production of the acidic mash up to the squeezing stage. At the latest before termination of the fermentation of the mash another mash is prepared without lactic acid bacteria. The acidic mash and sweet mash may be mixed at a mixing ratio of 3:4 by means of mixing pumps and squeezed out so that a pH-value of 4.1 is attained in the mixed juice, which is pasteurized and then decanted, or decanted and then pasteurized, as described hereinabove for the sour juice. Pasteurization is preferably carried out at a minimum temperature of 65° C., preferably at 72° C.

One may cool one or both mashes before mixing them, in order that fermentation may be braked in case of intermediate storing of the mash.

When using continuously operating presses for recovering the juices, the process of recovering the juices may be continuously carried out, with the fermented material as from the mash, and with the sweet material as from the raw material up to decanting, inclusively of the mixing.

The acidic residues obtained contain lots of lactic acid bacteria, and are preserved by the fermentation. One may mix the same with unfermented materials, for example with green fodder or additionally with nonfermented residues, and ram the same into a silo as fodder. In the silo the lactic acid bacteria present effect a rapid fermentation, whereby the fodder is preserved.

The foregoing detailed description has been given for clearness of understanding only, and no unnecessary limitations should be understood therefrom, as modifications will be obvious to those skilled in the art.

What is claimed is:

1. A method for the production of durably preserved vegetable juices with simultaneous recovery of lactic-acidic residues by lactic acid fermentation and subsequent pasteurization, comprising the steps of producing a vegetable mash, exposing said vegetable mash to lactic fermentation until the pH-value has dropped to below 4.5, admixing the fermented acid vegetable mash with an unfermented mash, then squeezing the juice out of the vegetable mash, and pasteurizing the squeezed-out juice.

2. A method for the production of durably preserved vegetable juices as defined in claim 1, including the step of grinding the vegetable used to produce the vegetable mash to a fibrous mass.

3. A method for the production of durably preserved vegetable juices as defined in claim 1, wherein the step of squeezing the juice out of the vegetable mash is performed by means of a continuously operating press.

4. A method for the production of durably preserved vegetable juices as defined in claim 1, including the step of subjecting the squeezed vegetable mash to a kneading action.

5. A method for the production of durably preserved vegetable juices as defined in claim 1, wherein the unfermented mash is of like origin as the fermented acid vegetable mash.

6. A method for the production of durably preserved vegetable juices as defined in claim 1, wherein the unfermented mash is of different origin than the fermented acid vegetable mash.

7. A vegetable juice made according to the process of claim 1 characterized by the fact that it contains lactic acid and exhibits a stable Tyndall effect.

References Cited
FOREIGN PATENTS 386,673  1/1933  Great Britain.
627,470  9/1961  Canada.

A. LOUIS MONACELL, *Primary Examiner.*

NORMAN ROSKIN, *Assistant Examiner.*

U.S. Cl. X.R.

99—9, 8, 155, 48